(12) United States Patent
Jawahar et al.

(10) Patent No.: US 8,522,256 B2
(45) Date of Patent: Aug. 27, 2013

(54) HOSTING NON-MESSAGING WORKFLOWS IN A MESSAGING HOST

(75) Inventors: Asad Jawahar, Woodinville, WA (US); Suwat Chitphakdibodin, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 200 days.

(21) Appl. No.: 12/902,157

(22) Filed: Oct. 12, 2010

(65) Prior Publication Data

US 2012/0089988 A1    Apr. 12, 2012

(51) Int. Cl.
*G06F 9/44* (2006.01)

(52) U.S. Cl.
USPC .......................................... 719/313; 717/117

(58) Field of Classification Search
None
See application file for complete search history.

(56) References Cited

U.S. PATENT DOCUMENTS

| | | | |
|---|---|---|---|
| 7,363,628 B2 | 4/2008 | Shukla et al. | |
| 7,680,683 B2 | 3/2010 | Hilerio et al. | |
| 2006/0069596 A1 | 3/2006 | Hatoun et al. | |
| 2006/0112062 A1 | 5/2006 | Leymann et al. | |
| 2006/0294048 A1* | 12/2006 | Shukla et al. | 707/1 |
| 2007/0156485 A1* | 7/2007 | Sanabria et al. | 705/8 |
| 2007/0156486 A1* | 7/2007 | Sanabria et al. | 705/8 |
| 2007/0156487 A1* | 7/2007 | Sanabria et al. | 705/8 |
| 2008/0040417 A1* | 2/2008 | Juncker | 709/201 |
| 2010/0169862 A1* | 7/2010 | Wolf et al. | 717/117 |

OTHER PUBLICATIONS

"Workflow Service Host Extensibility", Retrived at << http://msdn.microsoft.com/en-us/library/ee358748(v=VS.100).aspx >>, Jul. 27, 2010, pp. 3.
Workflow Service Host Internals, Retrieved at << http://msdn.microsoft.com/en-us/library/ff729690.aspx >>, Jul. 28, 2010, pp. 4.
Goldshtein, Sasha, Workflow Services Limitations: Part 1—External Transactions, Retrived at << http://blogs.microsoft.co.il/blogs/sasha/archive/2008/05/04/workflow-services-limitations-part-1-external-transactions.aspx >>, Jul. 27, 2010, May 4, 2008.

* cited by examiner

*Primary Examiner* — Charles E Anya
*Assistant Examiner* — Abdou Seye

(57) ABSTRACT

A workflow hosting system is described herein that allows non-messaging workflows to be hosted by a message-based service host. The system provides a host implementation, which can be used to host non-messaging workflows, or workflows that either do not begin with a message activity or do not use messaging activities at all. When the host receives a message for a workflow service, if it is not already running (or persisted), the system creates a new workflow service instance. If a workflow does not begin with a message activity, it cannot be started by sending a message because there is no activity to receive the message. To host a non-messaging workflow, the system provides a translation layer that sits between the communication layer and the workflow with methods that a developer can override to correctly activate the workflow.

19 Claims, 3 Drawing Sheets

HOSTING NON-MESSAGING WORKFLOWS IN A MESSAGING HOST

BACKGROUND

Software programming has evolved over time from writing applications in low-level languages, such as assembly, to high-level languages like C++, C#, and Visual Basic. Higher-level languages often remove low-level management of memory and other machine-based limitations in favor of allowing the programmer to think more in terms of objects that represent the problem to be solved. However, there is still much complexity in application logic, particularly when managing asynchronous processing. Workflows, such as those provided by MICROSOFT™ WINDOWS™ Workflow Foundation (WF), provide a declarative framework for formulating application and service logic in a high-level manner as one or more workflows. Workflows are made of activities that process a particular step of the application's processing. A group of activities forms a workflow. Workflows can be paused and resumed as applications wait for responses from other components, and are particularly well suited to asynchronous programming and improves developer productivity. WF provides a set of tools for declaring workflows, activities to help define the logic and control flow, and a runtime for executing the resulting application definition.

Workflows are hosted in a workflow host, which provides the runtime logic for reading and processing the activities of the workflow. In MICROSOFT™ .NET 4.0, WF introduced the ability to include messaging activities in a workflow and to host messaging-based workflows as a MICROSOFT™ WINDOWS™ Communication Foundation (WCF) service. This allows developers to quickly write applications that send and receive messages and act as a service. Messaging activities make it easy for developers to send, receive, and reply to messages between applications or application components.

Workflows may exercise or demand certain capabilities that are offered only by certain types of hosts. For example, a workflow that wants to receive messages (using messaging activities) needs a host that has messaging capabilities or a 'messaging host'. Messaging is the primary means of activating/creating workflow instances and data exchange with workflows in a messaging host. On the other hand, non-messaging workflowscan be hosted by a non-messaging host that provides alternate means to create instances of such workflows and exchange data with them. A developer may not intend to lock himself into one type of workflow (messaging vs. non-messaging) when writing an application, and may want to define a set of workflows that can be run in the same host and interact with them in a consistent fashion. Today, the developer's only choice is to use different hosts for messaging and non-messaging workflows and interact with them differently.

SUMMARY

A workflow hosting system is described herein that allows non-messaging workflows to be hosted by a message-based workflow host. The system provides a host implementation, WorkflowServiceHost, which can be used to host non-messaging workflows, or workflows that do not receive messages. Messaging workflows are activated by sending a message. The workflow receives a message as the first thing; in other words, it begins with a Receive activity. When the WorkflowServiceHost receives an activating message for a workflow, the host creates a new workflow instance and dispatches the message to it. A workflow may receive subsequent messages sent to it. If a workflow does not begin with a Receive activity, it cannot be started by sending a message because there is no activity to receive the message. To host a non-messaging workflow, the system provides an abstraction (e.g., an extensibility layer or messaging to non-messaging translation layer) that sits between the communication layer and the workflow, called a WorkflowHostingEndpoint, with methods that a developer can override to correctly activate the workflow and pass data to/from the workflow. As a result, to external clients it would appear that they are communicating with a messaging workflow. Thus, the workflow hosting system allows a developer to write a set of workflows with or without messaging activities and host them in the same host.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
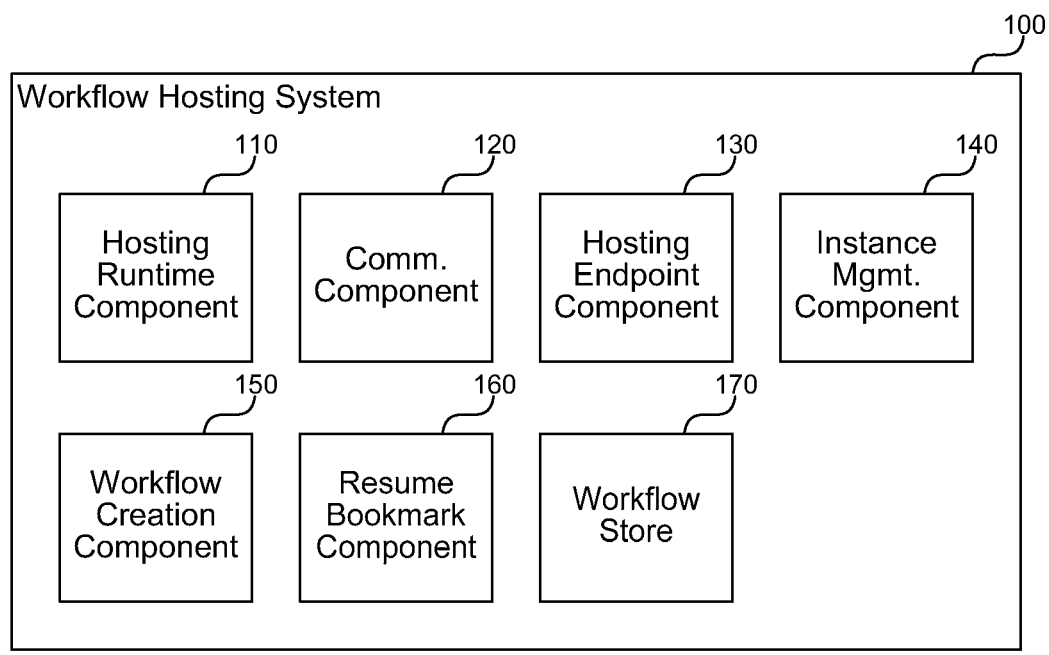
FIG. 1 is a block diagram that illustrates components of the workflow hosting system, in one embodiment.

A workflow hosting system is described herein that allows non-messaging workflows to be hosted by a message-based service host. The system provides a host implementation, WorkflowServiceHost, which can be used to host non-messaging workflows, or workflows that either do not begin with a Receive activity or do not use messaging activities at all. Workflow services normally begin with a Receive activity. When the WorkflowServiceHost receives an activating message for a workflow service, if it is not already running (or persisted), the system creates a new workflow service instance. If a workflow does not begin with a Receive activity, it cannot be started by sending a message because there is no activity to receive the message.

To host a non-messaging workflow, the system provides a translation layer that sits between the communication layer and the workflow, called a WorkflowHostingEndpoint, with methods that a developer can override to correctly activate the workflow and exchange data with the workflow. For example, the endpoint may provide an OnGetInstanceId method that a developer can override to provide a preferred instance identifier, an OnGetCreationContext method that a developer can override to provide inputs to the workflow, and an OnResolveBookmark that a developer can override to manually extract a bookmark from an incoming message and resume the workflow execution. A developer can create a new instance of a non-messaging workflow by upon receiving a message by providing an implementation of the WorkflowHostingEndpoint. The developer can specify the set of acceptable messages using a contract (WCF service contract). The developer can add the implementation of the WorkflowHostingEndpoint to the host (e.g., by calling AddServiceEndpoint). Thus, the workflow hosting system allows a developer to write workflows independent of messaging activities and to host the workflows in either messaging or non-messaging hosts or host all their workflows (messaging and non-messaging) in the message host.

Workflows create bookmarks whenever some asynchronous work needs to be done or when the workflow needs to wait for some external event, such as receiving user input through a user interface. These bookmarks are resumed when the work is completed or when the external event fires, causing the workflow to continue execution. Workflows can be long running and may store durable state in a persistence store. The workflow may go out of memory when it is waiting for a bookmark to be resumed and brought back into memory by the workflow host for further execution because of an external event or when the asynchronous work is complete.

Workflows are hosted in application hosts that may offer varying capabilities. For example, a host may support concurrent execution of many workflow instances. One such capability that a host may offer is messaging. Workflows targeting a messaging host can be authored using specialized messaging activities to exercise the host messaging capabilities, such as activities for sending and receiving messages. Messages are the main way for interacting with workflows in messaging hosts and messaging hosts usually do not offer other means to resume bookmarks on the workflows. These multi-instance messaging hosts introduce some challenges because the workflow definition has to rely on messaging activities when the workflow needs external input or an event to continue execution. A Receive activity creates a bookmark that is resumed when the appropriate message is received. Another problem this introduces is activation of instances. In a messaging host, instances are created when an activation message, indicated by the workflow definition, is received by the host. This creates a strong coupling with the host messaging capabilities, and, as a result, the program author cannot create workflows that are agnostic to host messaging capabilities and can be hosted in both messaging and non-messaging hosts.

As noted above, the workflow hosting system described herein provides a messaging host that can host non-messaging based workflows, sometimes called non-messaging workflows. The workflow hosting system can create and host instances of non-messaging workflows in a messaging host, resume bookmarks and pass in data obtained from a received message and/or other sources to a workflow hosted in a messaging host, create workflow instances with an externally provided identifier, provide start up input obtained from a received message and/or other sources to workflows hosted in a messaging host, and get outputs from non-messaging workflows hosted in a messaging host.

FIG. 1 is a block diagram that illustrates components of the workflow hosting system, in one embodiment. The system 100 includes a hosting runtime component 110, a communication component 120, a hosting endpoint component 130, an instance management component 140, a workflow creation component 150, a resume bookmark component 160, and a workflow store 170. Each of these components is described in further detail herein.

The hosting runtime component 110 executes workflow activities and manages the execution of a workflow host. A messaging workflow host is a host that provides capabilities to send and receive messages from workflows. The host employs endpoints where external entities can send messages. An endpoint exposes a specific contract that describes the message format of the messages that are accepted using a specific wire protocol at a specific address. If the workflow definition relies on host messaging capabilities then this contract defines the messages the workflow accepts.

The communication component 120 connects the workflow host to a network for communication with other systems. For example, the communication component 120 may connect one or more hosted endpoints to the Internet or a local area network through which the messaging host sends and receives messages related to messaging workflows.

The hosting endpoint component 130 provides an endpoint for hosting non-messaging workflows. Unlike most endpoints managed by the hosting runtime component 110, the hosting endpoint component 130 manages workflows that do not explicitly accept messages. Endpoints provided by the hosting endpoint component 130 can expose any contract and accept messages that conform to the contract. Messages are then consumed by the host and then either a new workflow instance is created or an existing workflow instance is resumed. After the successful execution of the workflow completes, the hosting endpoint component 130 may perform additional processing, such as sending a notification to the creator of the workflow with any output from the workflow.

The instance management component 140 manages workflow instances to create, pause, and resume workflow instances. For example, the instance management component 140 may unload a workflow that is waiting on a bookmark event to occur, such as receiving a message or other form of input from another component. As events occur, the hosting endpoint component 130 may invoke the instance management component 140 to find an appropriate instance to handle incoming messages. If a previously paused instance is found that matches the event (e.g., based on data in a received message), then the instance management component 140 invokes the resume bookmark component 160 to load the paused workflow and provide the incoming data. If no previous instance is found and the message is an activating message, then the instance management component 140 invokes the workflow creation component 150 to create an appropriate workflow instance.

The workflow creation component 150 creates a workflow instance in response to a message received by the workflow host. The component 150 creates a new workflow instance (optionally associated with an identifier specified in the message), passing it start up inputs extracted from the message and/or obtained from other sources. For example, the component 150 may obtain additional data loaded from a database. For a request/reply contract, the workflow creation component 150 also sends a response back to the message sender.

The resume bookmark component 160 resumes a paused workflow instance in response to a message received by the workflow host. The component 160 may pass data extracted from the message or obtained from some other source to the workflow as the bookmark is resumed. For example, a document management system may receive a document identifier in the message, load a document from a document store using the identifier, and pass the actual document to the workflow for further processing. The data can also be passed indirectly to the workflow. For example, workflows in a list management system may rely on an ambient 'owner' property to be populated. A hosting endpoint implementation can populate the ambient context available to the workflow before resuming a bookmark on the workflow. If the contract is request/reply in nature then the resume bookmark component also sends a response back to the message sender.

The workflow store 170 stores workflow definitions and persisted workflow instances. The workflow store 170 may include one or more files, file systems, databases, cloud-based storage services, or other storage facilities for persisting data over time. The workflow store 170 stores workflow definitions that describe workflow activities and the actions to be performed when the workflow is executed by the hosting runtime component 110. The workflow store 170 also stores persistent information related to paused workflow instances, such as state information, parameters, and other data used by the workflow when it is resumed. Workflows can be used to implement a variety of processes and the types of data used by each workflow are defined by the workflow author.

The computing device on which the workflow hosting system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
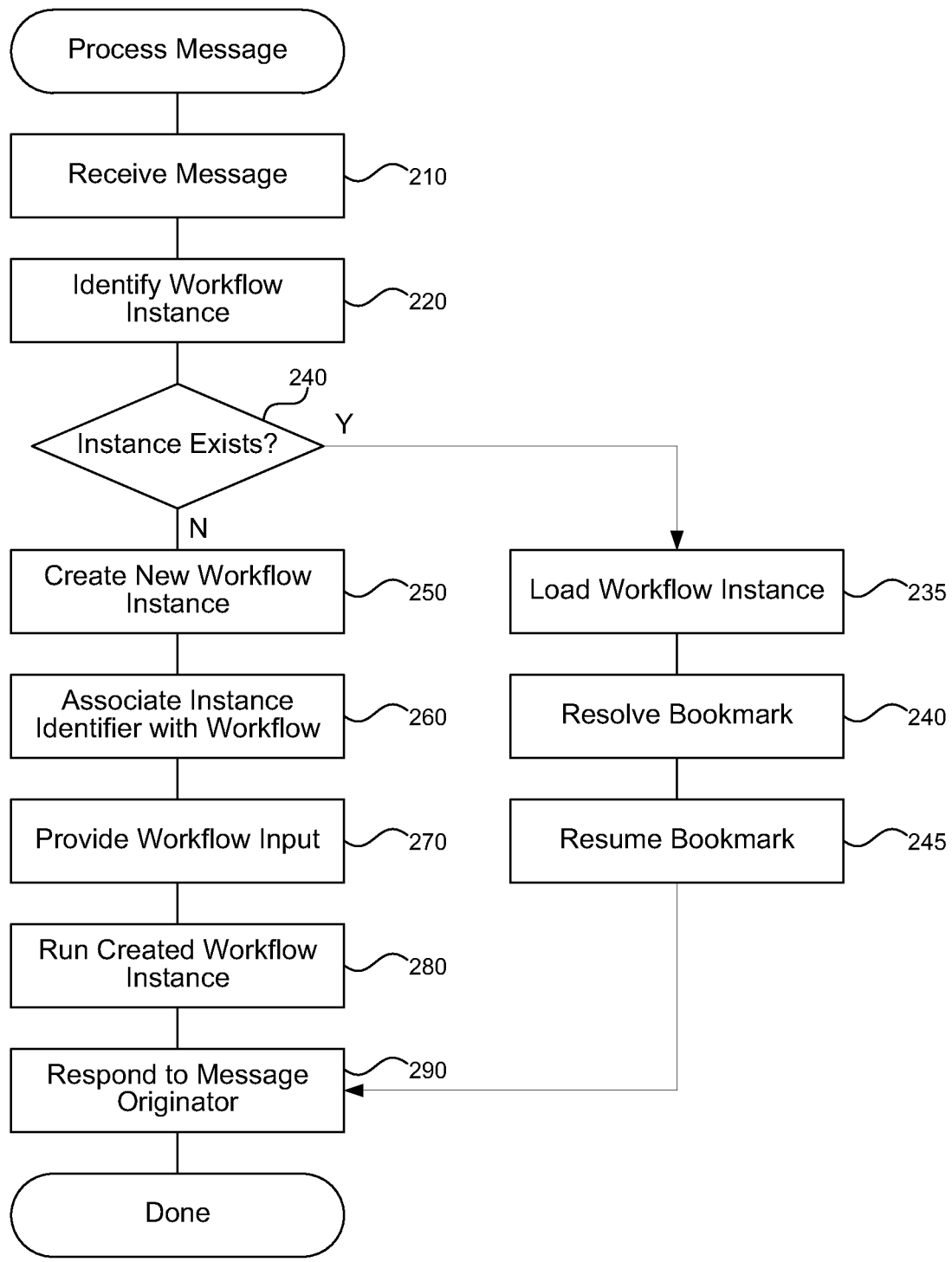
FIG. 2 is a flow diagram that illustrates processing of the workflow hosting system to process a message received for a non-messaging workflow, in one embodiment.

FIG. 2 is a flow diagram that illustrates processing of the workflow hosting system to process a message received for a non-messaging workflow, in one embodiment. Beginning in block 210, the system receives a message at a messaging host, wherein the message is directed to a non-messaging workflow. For example, a messaging-based service may send a message to a workflow that was designed to be host type agnostic, so that the workflow can be used with both messaging and non-messaging hosts. Since messaging services communicate using messages, a messaging service interacting with the non-messaging workflow sends a message that is received by the messaging host.

Continuing in block 220, the system identifies a workflow instance associated with the received message. For example, the received message may include an instance identifier in the message, or the system may determine the instance identifier using some application-specific correlation mechanism. Once the manner of identifying the instance is selected, the system determines whether the specified instance exists (i.e., was previously created or not yet created). Continuing in decision block 230, if the system determines that the instance exists, then the system continues at block 235, else the system continues at block 250.

Continuing in block 235, the system loads the existing identified workflow instance. For example, the system may load the instance from a persistent data store if the instance has been paused and pushed out to long-term storage, or the system may identify the instance in memory if the instance is still loaded and available. Continuing in block 240, the system resolves a bookmark set while execution of the identified workflow instance was previously paused. For example, the bookmark may identify a particular activity within the workflow during which the workflow waits for further input, so that execution of the workflow can resume after the input is received.

Continuing in block 245, the system resumes execution of the workflow based on the resolved bookmark. The bookmark causes the host to resume execution at a particular location or activity within the workflow so that the workflow can continue where execution previously left off. The received message may provide one or more input parameters that the messaging host supplies to the resumed workflow instance in a non-messaging format. A hosting endpoint provided by the messaging host may strip off any messaging headers or other information to provide data to the non-messaging workflow in a format that the non-messaging workflow is designed to process.

If the instance already exists and was not created, then the hosting endpoint will resume a bookmark on the workflow instance. The bookmark to be resumed is determined by user-defined logic (e.g., written by the hosting endpoint developer). This logic can be based on some data in the message, for instance the bookmark name may be included in the message itself. The hosting endpoint may also send a response back to the caller for request/reply contracts. Optionally the response can be delayed until the bookmark resumption has been completed and results may be included in the response. If bookmark resolution fails (not shown) then a fault message is sent back to the caller. After block 245, processing continues at block 290.

Continuing in block 250, the system creates a new instance of the workflow to process data associated with the received message. The hosting endpoint handles translation of the received message into a format that the non-messaging workflow can process. If the instance to which the message is sent does not exist in the system, a new instance may be created. This provides the mechanism to activate new instances of a non-messaging workflow in a messaging host. Continuing in block 260, the system associates an identifier with the created workflow instance so that the instance can be referenced in subsequent received messages. The hosting endpoint may provide output from the non-messaging workflow that includes the instance identifier as a reply message to the originator of the received message. If an instance identifier was specified in the received message then the newly created instance is associated with this identifier; otherwise, the system picks an identifier for the created instance.

Continuing in block 270, the system provides any input from the received message to the created workflow instance. If a new instance has been created because of receiving the message, then implementers are given the opportunity to provide initial input for the workflow and send a response to the originator of the message. Continuing in block 280, the system runs the created workflow instance within the messaging host. Running the instance causes the hosting runtime to process the workflow activities in turn until a workflow activity is reached that causes a pause in execution waiting for further input or until the workflow completes (see FIG. 3).

Continuing in block 290, the system optionally provides a response message to the originator of the received message. The response may include any output from the non-messaging workflow, such as output parameters, failure indications, completion data, and so forth. After block 290, these steps conclude.

Figure 3:
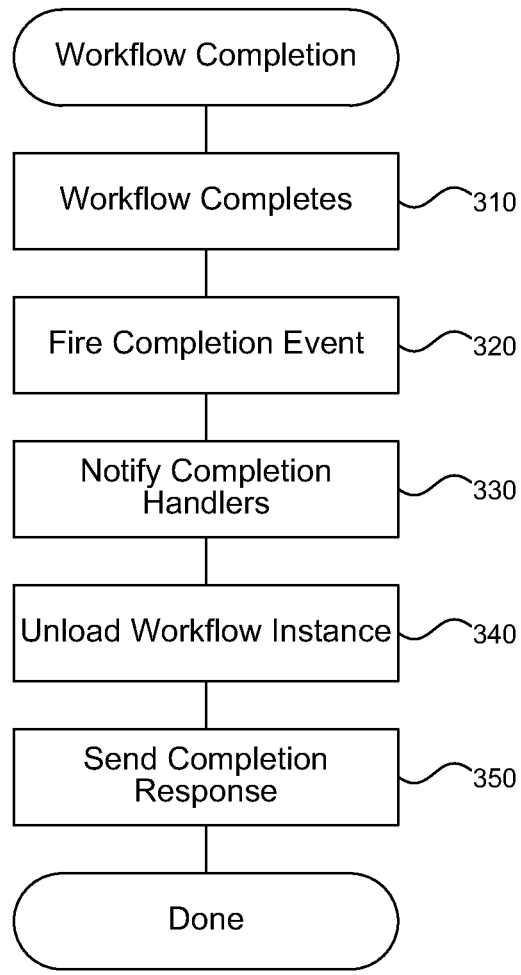
FIG. 3 is a flow diagram that illustrates processing of the workflow hosting system to handle workflow completion, in one embodiment.

FIG. 3 is a flow diagram that illustrates processing of the workflow hosting system to handle workflow completion, in one embodiment. Beginning in block 310, the system determines that a non-messaging workflow instance running in a messaging host has completed. For example, the host may manage the runtime that executes each activity in the workflow and receive an indication from the runtime when the last activity is complete.

Continuing in block 320, the system fires a completion event that identifies a completion state and any output from the workflow. After the workflow has completed execution, an event is fired which includes as arguments the completion state (successful or not), the outputs of the workflow, or an exception if the workflow completed in error. User code can listen for this event to handle workflow completion, for example, by sending a notification message or perform some calculation on the outputs. Continuing in block 330, the system notifies one or more completion handlers registered to receive the fired completion event. The completion handlers can perform any final work, such as sending messages. The handlers may perform different steps based on whether the workflow completed successfully or based on output received from the completed workflow.

Continuing in block 340, the system unloads the workflow instance. Unloading the workflow instance concludes the workflow's interaction with the runtime and may include persisting information (e.g., run statistics or other logging) as well as removing the workflow and any associated resources from memory or marking the workflow and resources for later removal (e.g., through garbage collection or other clean up). Continuing in block 350, the system optionally sends a completion response message to any other components bound to a hosting endpoint associated with the non-messaging workflow instance. User code can optionally be executed in a transaction, which provides the ability to roll back workflow completion by aborting the transaction if anything fails. After block 350, these steps conclude.

In some embodiments, the workflow hosting system provides a service host extensibility layer that allows service developers to provide extensions that participate in and extend host level functionality like instance lifetime management, custom policies pivoting on instance state changes, registration of instance extensions, and performing pre-initialization or post cleanup work around the activation cycle. The extensions can be invoked by the host synchronously and provide guarantees on the control operations performed by the extensions. Alternatively or additionally, the system may move extensions outside of the service boundary to eliminate host guarantees and reentrancy problems. The system can provide notification on various workflow state changes so that application developers can write software code to perform any application-specific work related to a workflow instance.

The following paragraphs provide example software code for managing non-messaging workflows in a messaging-bases service host using MICROSOFT™ WF 4.0.

As one example, a customer migrating to WF 4.0 may want to host workflows that do not rely on messaging using WorkflowServiceHost. In order to do that he creates a WorkflowServiceHost instance passing it the workflow definition. To create instances of this workflow, he implements a ServiceEndpoint derived from WorkflowHostingEndpoint and overrides the OnGetCreationContext as follows.

```
//contract for my WF creation service
public interface IWFCreationService
{
    //returns the Id of the created instance
    string CreateInstance( );
}
//my application endpoint
public class WFCreationEndpoint : WorkflowHostingEndpoint
{
    //override to support instance creation
    protected override WorkflowCreationContext OnGetCreationContext(
            object[ ] inputs,
            OperationContext operationContext,
            Guid instanceId,
            WorkflowHostingResponseContext
responseContext);
    {
            //override to provide reply for R/R operation on my
            contract:
    (IWFCreationService.CreateInstance( ))
    responseContext.SendResponse(instanceId.ToString( ), null);
            return new WorkflowCreationContext( );
    }
}
WorkflowServiceHost wfsh = new WorkflowServiceHost(wf);
wfsh.AddServiceEndpoint(new WFCreationEndpoint(IWFCreationService,
new BasicHttpBinding( ), new EndpointAddress("http://myserver"));
```

The above code is sufficient to implement the creation of instances. If the customer wants to be notified of workflow completion, for example, to send a notification to the creator, he would provide an implementation of WorkflowCreation Context and override On Beg in WorkflowCompleted/OnEndWorkflowCompleted as follows.

```
//contract for my WF creation service
[ServiceContract]
public interface IWFCreationService
{
    //create with the notification endpoint address
    [OperationContract]
    void CreateInstance(Uri notificationAddress);
}
//my application endpoint
public class WFCreationEndpoint : WorkflowHostingEndpoint
{
    //override to support instance creation
    protected override WorkflowCreationContext OnGetCreationContext(
            object[ ] inputs,
            OperationContext operationContext)
    {
            MyWorkflowCreationContext wfcparams = new
MyWorkflowCreationParameters( );
            wfcparams.UserState = inputs[0];
```

```
            return wfcparams;
        }
}
public class MyWorkflowCreationContext : WorkflowCreationContext
{
    IMyNotificationContract client;
    protected override IAsyncResult OnBeginWorkflowCompleted(
                        ActivityInstanceState completionState,
                        IDictionary<string, object> workflowOutputs,
                        Exception faultedReason,
                        TimeSpan timeout,
                        AsyncCallback callback,
                        object state)
    {
                //do the following async
                client =
ChannelFactory<IMyNotificationContract>.CreateChannel(new
BasicHttpBinding( ), (Uri)userState.CreateChannel( );
                if(completionState == ActivityInstance.Closed)
                        return client.BeginNotifyCompletion(workflowOutputs,
timeout,...);
                else if(completionState == ActivityInstance.Canceled)
                        return client.BeginNotifyCancel(timeout,...);
                else if(completionState == ActivityInstance.Faulted)
                        return
client.BeginNotifyFault(faultedReason.ToString( ),timeout);
        ....
    }
    protected override void OnEndWorkflowCompleted(IAsyncResult result)
    {
        ...
    }
    protected override void OnAbort( )
    {
        If(client != null)
                Client.OnAbort( );
    }
}
```

In order to provide configuration support for the hosting endpoint created above, the user would need to implement a StandardEndpointElement and register in the machine.config. For the above example, the configuration would resemble the following.

```
<services>
<service name="TestService">
<endpoint name="HostingEndpoint"
    kind="MyHostingEndpoint"
    endpointConfiguration="hostingConfig"
    address="http://localhost/myservice"
    binding="basicHttpBinding"
    contract="IWFCreationService"/>
</service>
<standardEndpoints>
<myHostingEndpoint>
<endpoint name="hostingConfig" />
</myHostingEndpoint>
</standardEndpoints>
</services>
```

As another example, assume a user wants to resume a bookmark on a workflow instance of a non-messaging workflow based on a message. The emblematic scenario is the Delay activity that resumes the instance after a specified duration. In order to do that the user implements a ServiceEndpoint derived from WorkflowHostingEndpoint and the user overrides the OnResolveBookmark method as follows.

```
//contract for my WF bookmark resumption service
[ServiceContract]
public interface IBookmarkResumptionService
{
    [ServiceOperation IsOneWay=true]
    void ResumeBookmark(string bookmarkname, GUID instanceKey,
string someData);
}
//my application endpoint
public class WFResumptionEndpoint : WorkflowHostingEndpoint
{
    WFResumptionEndpoint(...)
    {
        //setup correlation query
        CorrelationQuery cq = new CorrelationQuery( );
        cq.Select = new
MessageQuerySet(
).Add("name",XPathMessageQuery("//InstanceId",null));
        this.CorrelationQueries.Add(cq);
    }
}
//override to resume bookmark
protected override Bookmark OnResolveBookmark(object[ ] inputs,
OperationContext operationContext,
    WorkflowBookmarkResponseContext responseContext, out object
value)
{
    value = someData;
    return new Bookmark(inputs[0]);
}
WorkflowServiceHost wfsh = new WorkflowServiceHost(wf);
wfsh.AddServiceEndpoint(new
WFResumptionEndpoint(IWFCreationService,
new BasicHttpBinding( ), new EndpointAddress ("http://myserver"));
```

The user can also support Request/Reply contracts by using the WorkflowBookmarkResponseContext:

```
protected override Bookmark OnResolveBookmark(
            object[ ] inputs,
            OperationContext operationContext,
            WorkflowBookmarkResponseContext responseContext,
            out object value)
{
    value = responseContext; //pass to the activity
    return new Bookmark(inputs[0]);
}
//after successful resumption send response back to caller
MyActivity:NativeActivity<foo> //activity that created bookmark being
resumed
{
    //activity owns creating bookmark and setting up correlation
    void OnBookmarkCallback(ActivityExecutionContext
    executionContext,
            Bookmark bookmark,
            object state)
    {
    //call sendResponse to send reply to caller
        WorkflowBookmarkResponseContext context = state as
WorkflowBookmarkResponseContext;
        context.SendResponse(returnvalue,otherOutputs);
    }
}
```

As another example, a user may want to start a workflow instance and send a completion email to his client when the workflow has successfully completed or if the workflow does not complete successfully he wants to log an error. The user can accomplish this either by creating a WorkflowHostingEndpoint implementation or by using tracking.

From the foregoing, it will be appreciated that specific embodiments of the workflow hosting system have been described herein for purposes of illustration, but that various modifications may be made without deviating from the spirit and scope of the invention. Accordingly, the invention is not limited except as by the appended claims.

We claim:

1. A computer-implemented method for processing a message received in a messaging workflow host for a non-messaging workflow, the method comprising:
    receiving the message at the messaging workflow host, wherein the message is directed to the non-messaging workflow, wherein the messaging workflow host communicates with workflows using messages, and wherein the non-messaging workflow is one that does not communicate with its host using messages;
    identifying a workflow instance associated with the received message;
    determining whether the identified workflow instance exists in the messaging workflow host;
    upon determining that the workflow instance does not exist,
        creating a new workflow instance to process data associated with the received message;
        associating an identifier with the created workflow instance so that the new instance can be referenced in subsequent received messages;
        providing any input from the received message to the created workflow instance; and
        running the created workflow instance within the messaging workflow host; and
    upon determining that the workflow instance exists,
        loading the existing identified workflow instance;
        resolving a bookmark set while execution of the identified workflow instance was previously paused; and
        resuming execution of the identified workflow instance based on the resolved bookmark, in a manner that the non-messaging workflow that is not designed to receive messages is started by receiving the received message, wherein the preceding steps are performed by at least one processor.

2. The method of claim 1 wherein receiving the message comprises a messaging-based service sending a message to a workflow that was designed to be host type agnostic, so that the workflow can be used with both messaging and non-messaging hosts, and wherein the messaging service interacting with the non-messaging workflow sends a message that is received by the messaging host.

3. The method of claim 1 wherein identifying the workflow instance comprises identifying an instance identifier in the received message that specifies the workflow instance.

4. The method of claim 1 wherein identifying the workflow instance comprises determining an instance identifier using an application-specific correlation mechanism.

5. The method of claim 1 wherein determining whether the identified workflow instance exists comprises looking up the workflow instance in a messaging host data store.

6. The method of claim 1 wherein loading the workflow instance comprises loading an instance from a persistent data store if the instance has been paused and pushed out to long-term storage, or identifying the instance in memory if the instance is still loaded and available.

7. The method of claim 1 wherein resolving the bookmark comprises determining a bookmark that identifies a particular activity within a workflow during which the workflow waits for further input, so that execution of the workflow can resume after the input is received.

8. The method of claim 1 wherein resolving the bookmark comprises identifying a bookmark specified within the received message.

9. The method of claim 1 wherein resuming execution of the workflow comprises causing the messaging host to resume execution at a particular activity within a workflow so that the workflow can continue where execution previously paused.

10. The method of claim 1 wherein resuming execution of a workflow comprises identifying one or more input parameters for the workflow in the received message that the messaging host supplies to the resumed workflow instance in a non-messaging format.

11. The method of claim 1 further comprising, after resuming execution of a workflow, providing a response message to the originator of the received message, wherein the response message includes any output from the non-messaging workflow.

12. A computer system for hosting non-messaging workflows in a messaging host, the system comprising:
    a processor and memory configured to execute software instructions embodied in the following components;
    a hosting runtime component configured to execute workflow activities and manage execution of a messaging workflow host, wherein the messaging workflow host communicates with workflows using messages, and wherein a non-messaging workflow is one that does not communicate with it's messaging host using messages;
    a communication component configured to connect the messaging workflow host to a network for communication with other systems;
    a hosting endpoint component configured to provide an endpoint for the messaging host to send and receive messages on behalf of non-messaging workflows;
    an instance management component configured to manage workflow instances to create, pause, and resume workflow instances in a manner that the non-messaging workflow that is not designed to receive messages is created, paused, and resumed by receiving a message, wherein upon receiving the message related to a workflow instance the instance management component identifies the workflow instance associated with the received message, determines whether the identified workflow instance exists and upon determining that the identified workflow instance does not exist,
- creating a new workflow instance to process data associated with the received message;
- associating an identifier with the created workflow instance so that the instance can be referenced in subsequent received messages;
- providing any input from the received message to the created workflow instance; and
- running the created workflow instance within the messaging workflow host; and upon determining that the identified workflow instance exists,
- loading the existing identified workflow instance;
- resolving a bookmark set while execution of the identified workflow instance was previously paused; and
- resuming execution of the identified workflow instance based on the resolved bookmark;

a resume bookmark component configured to resume a paused workflow instance in response to a message received by the messaging workflow host; and a workflow store configured to store workflow definitions and persisted workflow instances.

13. The system of claim 12 wherein the host runtime component is further configured to provide capabilities to send and receive messages from workflows and provide at least one endpoint to which external entities can send messages, wherein an endpoint exposes a specific contract that describes a message format of one or more messages that are accepted using a specific wire protocol at a specific address.

14. The system of claim 12 wherein the hosting endpoint component is further configured to expose a contract for accepting messages and to identify one or more workflow instances to receive data in a non-messaging format associated with received messages.

15. The system of claim 12 wherein the hosting endpoint component is further configured to, after the successful execution of a workflow, send a notification to a message sender that includes any output from the workflow.

16. The system of claim 12 wherein the instance management component is further configured to receive requests from the hosting endpoint component to find an appropriate existing instance or created a new instance to handle incoming messages.

17. The system of claim 12 wherein the resume bookmark component is further configured to pass data extracted from a received message to a workflow instance as the bookmark is resumed.

18. The system of claim 12 wherein the resume bookmark component is further configured to provide a reply message to a message sender that indicates one or more outputs of executing a workflow instance in response to a received message from the message sender.

19. A computer-readable storage medium comprising instructions for controlling a computer system to process a message received in a messaging workflow host for a non-messaging workflow, wherein the instructions, upon execution, cause a processor to perform actions comprising:
- receiving the message at the messaging workflow host, wherein the message is directed to the non-messaging workflow, wherein a messaging workflow host communicates with workflows using messages, and wherein the non-messaging workflow is one that does not communicate with its host using messages;
- identifying a workflow instance associated with the received message;
- determining whether the identified workflow instance exists in the messaging workflow host;
- upon determining that the workflow instance does not exist,
  - creating a new workflow instance to process data associated with the received message;
  - associating an identifier with the created workflow instance so that the new instance can be referenced in subsequent received messages;
  - providing any input from the received message to the created workflow instance; and
  - running the created workflow instance within the messaging workflow host; and
- upon determining that the workflow instance exists,
  - loading the existing identified workflow instance;
  - resolving a bookmark set while execution of the identified workflow instance was previously paused; and
  - resuming execution of the identified workflow instance based on the resolved bookmark, in a manner that the non-messaging workflow that is not designed to receive messages is started by receiving the received message, wherein the preceding steps are performed by at least one processor.

* * * * *